Patented Jan. 15, 1929.

1,699,502

UNITED STATES PATENT OFFICE.

HENRY L. CROWLEY, OF EAST ORANGE, NEW JERSEY, ASSIGNOR TO ISOLANTITE COMPANY OF AMERICA, INC., A CORPORATION OF DELAWARE.

METHOD OF MOLDING CERAMIC MATERIALS.

No Drawing.   Application filed January 11, 1927. Serial No. 160,523.

The present invention relates primarily to the production of ceramic materials by what may be termed vacuum molding. The broad aspects of such a process are set forth in Dimitri and Delaunay Patent No. 1,374,493 dated April 12, 1921.

The process of the patent is of great value and importance, but I have found that in order to produce articles on a commercial scale under said patent, it is advisable to follow certain requirements. The basic factor on which these requirements are founded is the necessity of keeping at a minimum the air or other gas that may be entrained. To this end the ceramic material is prepared as a very fine powder, and while a small amount of binder may be used which may moisten the powder somewhat, it is highly essential that the mass remain as an aggregate of powdered particles as distinguished from the case where powdered material is made into what may be termed a colloidal paste. The powder thus prepared is subjected to as great a degree of vacuum as is commercially possible (for example a vacuum leaving only a small fraction of an inch in the mercury column) and then is subjected to pressure. Even a very close approximation to true vacuum will in the first instance leave in the powder a certain amount of entrained air, but this can be reduced to a substantially insignificant quantity if the pressure is so applied that the plunger moves in the same direction as the flow of air from the press, and if the depth of the powder in the press is not too great. For example, if a cylinder is being pressed, the length of the finished cylinder along the axis of pressure should never be more than four times the diameter, and preferably should not be more than three times the diameter. This same rule applies to other shapes so that one cannot successfully mold in this way a cup shaped body having a wall height greater than four times the maximum transverse dimension or thickness of the wall. Even within these limits such a body would be difficult to mold owing to the necessity of using a washer or "grain" that is only slightly smaller than the inside diameter of the mold to permit the passage of air without drawing up the powder. It is also desirable that like articles shall have been subjected to the same degree of pressure in order to give them uniform characteristics.

In view of these considerations it has, as a practical matter, been necessary to first mold solid blocks from the powder and then machine out of the block the article of desired shape. The block of compressed powder is non-malleable and non-ductile but ordinarily has sufficient strength to be handled and cut to shape. However even when care is taken in forming the blocks they show to a greater or lesser extent flat planes of cleavage or tendency to flake off along lines transverse the axis of pressure.

I have found that this tendency to weakness can be largely overcome and articles of many different shapes and proportions can be produced if the blocks made according to the process just described are subjected, again in vacuum, to a second pressing operation where a pressure preferably greater than that used in the first operation is applied in such a way as to cause the particles of material (which have not coalesced in any way and still may be crumbled apart to their original state) to move or flow relatively to each other. This relative movement of the particles in the mass increases the strength of the material for apparently the particles are made to fit together more closely or "shaken down." The cleavage planes either entirely disappear or are so distorted and broken up that their tendency to weaken the product is substantially eliminated. During this second pressing operation, the air should be removed from the mold and since one of the objects is to cause the particles to pack down relatively to each other, care should be taken to prevent the block from crumbling. To this end the block should be made up such a shape that it will just slip into the second press so that it will not all break to pieces when compressed but will have its sides supported, and the pressure should be applied steadily and uniformly so that the material may be said to flow in the mold. If a uniform pressure is applied to like articles in the second operation, uniformity in the production of the blocks is unimportant. On the other hand, the second pressing can be carried out more rapidly than the first one where a time factor is necessary to permit the air to escape.

These factors permit a greatly increased rate of production, for it is possible to form the preliminary blanks in a gang press without making absolutely accurate measurements of the amount of material put in each mold (which would be necessary if a uniform pressure were to be applied simultaneously to a number of lots of powder in such an apparatus) so that a large number of blanks can be formed simultaneously but slowly. The blanks can then be put, one by one, into an individual hydraulic press which will operate under a uniform pressure but at a relatively high rate of speed to form finished articles. For example, I have found that such a procedure using a pressure of from 1500 to 3000 pounds to the square inch in the first operation and a pressure at least twice as great in the second step is well adapted for the production of cup shaped bodies to be used as bases for radio tubes where the walls of the cup are less than one-eighth the height of such walls. To form such a shape by previously known methods demanded making a block of a size at least as great as the outside dimensions of the finished article and then cutting away the interior by machining.

Where it is desired to produce an article of great length and uniform cross section such as a rod, I have found that the rearrangement of particles by causing them to flow, can be accomplished in a semi-continuous way by using a process somewhat similar to the extrusion process that has been developed for handling plastic or malleable materials. The blank is put into a press having an orifice of the desired shape and a vacuum pump is connected to the chamber. As pressure is applied the blank is forced against the orifice and seals the same, so that substantially all the air can be pumped out of the chamber.

In using the extrusion press, it is again important to support the sides of the blank against crumbling, just as was found to be the case where individual shapes were being pressed out. If the sides of the blank are not supported, the pressure will crumble the material and while the pressure used (which may be as great as 10,000 pounds to the square inch, or in some cases substantially greater) will tend to re-form a new block in the press, my experience has been that this block will not be entirely uniform. Some usable material can be obtained, but apparently there is a different resistance against the pressure between the portions of the block which stay compacted and those which pulverize, the result being that the extruded shape shows weak spots and defects. It is therefore highly desirable to form the blank so that it will just slide into the extrusion press chamber. If this is done and the air is carefully pumped out, it is possible even to make severed portions of the material flow together into a unified whole. For example, two or more blocks can be inserted one behind the other in the chamber of the extrusion press, thereby permitting the formation of a member of very great length which of course can be cut off into the desired shorter lengths for ease of handling.

This ability to cause separated surfaces of air-freed material to flow together also permits the formation of hollow shapes or tubes in the extrusion press. Such tubes are formed by inserting a core inside and in front of the orifice which core is supported by a member having radial arms known as the spider. The spider will cut the flowing material into sections but as the material moves toward the restricted orifice the pressure will cause particles of the cut surfaces to flow together again, producing a hollow member with sufficient strength so that it can readily be handled and machined and which will show no substantial line of weakness where the reuniting took place and will show no flat transverse planes of cleavage. For example, where extruded rods are formed, any cleavage that will remain will tend to show the shape of an extended cone. This is apparently due to the fact that the particles near the center of the rod have flowed in a direction substantially parallel to the axis of the rod, whereas those particles that are found near the surface have been forced in at an angle due to the tapered shape of the orifice. This distortion of the cleavage planes greatly strengthens the finished article.

After the articles are formed by the two-stage pressing operation, they may be dried at a temperature of about 140° F. for 24 to 36 hours. They are then given any finishing treatment or machining that may be desired and fired at a temperature appropriate to the material used. For example, I may use finely powdered natural silicate of magnesium mixed with a small amount of binder and a multiple natural silicate which will flux under the influence of heat, which powder is only slightly moistened so that if the powder is compressed in the hand it can readily be crumbed. With such material the final firing temperature should be between 1400 and 1500° C. and the time will be about four hours.

I have described my process as applied to ceramic materials as this appears to be the principal field for use for the same, but I do not wish to limit myself thereto as the same may be used to advantage in other lines of activity, for example, this process may be applied to molding articles of metal or carbon or these substances combined. Thus finely powdered graphite may be thoroughly mixed with copper powder and a small amount of binder, compressed slowly in vacuum as described, and thereafter extruded or otherwise molded under the conditions set forth above. The resulting product may be given a subsequent heat treatment to cause the particles of copper to coalesce, or if proper precautions are taken the heat may be applied directly at the orifice of the extrusion press. In a similar way carbon may be mixed with a small amount of binder pressed in vacuum and remolded as described and then converted into graphite. Other uses of my process may be readily developed by those skilled in the art.

What I claim is:

1. The method of molding bodies of powdered materials which comprises subjecting such powdered material to great pressure while evacuating the air whereby a non-malleable block is produced, and thereafter subjecting such block substantially in the absence of air to a second pressure greater than the first, which is adapted to change the shape of the block without crumbling the same, whereby particles of the powder of which the block is composed are given a movement relative to each other adapted further to compact them.

2. The method of molding ceramic materials which comprises the steps of forming a substantially air-free, compact block of ceramic material, supporting the sides of said block in such a way as to substantially prevent crumbling and subjecting the block to pressure adapted to cause the material of the block to flow into a different shape while keeping the flowing material substantially out of contact with the air.

3. The method of molding ceramic materials which comprises the steps of forming a block by extracting the air from powdered ceramic material and compressing such material by a pressure in excess of 1500 pounds to the square inch, and then reshaping such block by causing the material thereof to flow in a substantially air-free mold under a pressure at least twice that used in forming the block.

4. The method of molding ceramic materials which comprises the steps of forming blanks by simultaneously and slowly compressing a plurality of lots of powdered ceramic material from which the air has been exhausted, and thereafter reshaping the blanks thus formed by subjecting them individually to uniform pressures applied in a mold from which the air has been exhausted, which mold is adapted to support the side of the blank during the reshaping operation.

5. The method of forming articles of ceramic material which comprises the steps of forming a non-malleable substantially air-free mass of pulverulent ceramic material and rearranging the relative positions of particles in such mass without entraining air, by evacuating the air from about said mass and forcing said mass through a restricted orifice by a pressure great enough to compact the rearranged particles into an article with substantial strength.

6. The method of forming ceramic shapes of great length which comprises the steps of compressing in vacuum powdered ceramic material to form air-free non-malleable blanks of a length along the line of pressure application not greater than four times the maximum transverse dimension arranging a plurality of such blanks in a row, supporting the sides of said blanks against crumbling, evacuating the air from about said blanks and forcing the material of said blanks successively through a restricted orifice whereby the material of said blanks is caused to unite and whereby a shape of great length is forced out of the orifice.

7. The method of molding which comprises the step of putting a substantially air-free, non-malleable mass of compacted ceramic materials under substantial vacuum and subjecting such mass to pressure adapted to cause the material to flow into the desired shape without crumbling.

8. The method of forming dense articles from powdered materials which comprises the steps of evacuating the air from a mass of powdered material comprising an ingredient adapted to flux under the influence of heat, compressing such powder while so evacuated to form a blank which is substantially air-free but may be crumbled to give the original powder, subjecting such blank to a subsequent pressing operation which will cause the particles of powdered material to flow relatively to each other whereby they are further compacted, but which will not cause the blank to crumble to any substantial extent, and subjecting the body of the reformed material to a heat treatment which will convert the same into a dense united mass.

HENRY L. CROWLEY.